(12) United States Patent
Takahashi et al.

(10) Patent No.: US 6,240,075 B1
(45) Date of Patent: May 29, 2001

(54) SATELLITE COMMUNICATION ROUTING ARBITRATION TECHNIQUES

(75) Inventors: Scott M. Takahashi, Torrance; Roland Y. Wong, Monrovia; Darren R. Gregoire, Redondo Beach, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/236,682

(22) Filed: Jan. 25, 1999

(51) Int. Cl.[7] .............................. H04B 7/204; H04L 12/56
(52) U.S. Cl. ......................... 370/325; 370/395; 370/414
(58) Field of Search .................................. 370/229, 235, 370/236, 238, 315, 316, 319, 325, 428, 429, 389, 390, 392, 395, 397, 399, 413, 414

(56) References Cited

U.S. PATENT DOCUMENTS 5,530,902 * 6/1996 McRoberts et al. .................... 710/28
5,805,816 * 9/1998 Picazo, Jr. et al. .................... 709/223
6,002,675 * 12/1999 Ben-Michael et al. ............... 370/315

* cited by examiner

Primary Examiner—Chau Nguyen
Assistant Examiner—D. Trinh
(74) Attorney, Agent, or Firm—Connie M. Thousand

(57) ABSTRACT

A satellite communication system which performs switching on data cells. A switch (80) receives the data cells at a set of input ports (IP1–IP128) and directs them to a set of output ports (OP1–OP128). In order to arbitrate input data cells contending for the same output port, decision factor codes and routing codes are serially conducted to input registers (210), and a pseudo-random sequence code is appended. The combined codes are ordered by routing code in a decoder (220). The code with the highest decision factor code is selected in one or more determinators (230 and 240). The selected code is identified by a bit in a result register (250).

17 Claims, 2 Drawing Sheets

SATELLITE COMMUNICATION ROUTING ARBITRATION TECHNIQUES

BACKGROUND OF THE INVENTION

This invention relates to data cell processing in a satellite communication system and more particularly relates to routing arbitration of such cells.

Weight and power are critical parameters when designing for space-based data cell routing where higher weight and power translate to higher spacecraft and launch costs and/or reduced capacity which would lower potential revenue.

A non-blocking routing switch with multiple input and output ports has significant power and weight advantages over bus or banyan type architectures, and such a switch requires some form of arbitration. Since all input sources to such a switch are independent, the multiple input ports may attempt to send data to the same output port at the same instant. Arbitration is required to resolve this potential conflict.

A terrestrial routing switch can include sophisticated arbitration algorithms executed on a high power computer. However, due to weight/power limitations on a spacecraft, such approaches are impractical, and there is a need for a low power solution which can arbitrate between data cells contending for the same node or port. The solution must be able to arbitrate in the time required to route a data cell aboard the satellite.

BRIEF SUMMARY OF THE INVENTION

One object of the invention is to provide arbitration in connection with the switching of data cells between input and output nodes suitable for use in a communication satellite.

Another object of the invention is to provide a cell switching arbitration capability which can select a single cell out of a group for data cells having the same destination priority and other decision factors in a fair manner.

Still another object of the invention is to provide a cell switching arbitration capability of the foregoing type which requires a minimum number of integrated circuit pins.

Yet another object of the invention is to provide a cell switching arbitration capability of the foregoing type capable of using serial transmission of data.

The preferred embodiment of the present invention is useful for data cell switching arbitration in a communication satellite. Data cells are stored with corresponding routing codes and corresponding decision factor codes, preferably in a buffer memory. A unique arbitration code is assigned to each cell being submitted to arbitration. The decision factor codes corresponding to like routing codes are compared, and, in the event the compared decision factor codes are identical, the unique arbitration codes associated with the compared decision factor codes are compared. The data cell corresponding to one of the compared unique arbitration codes is then selected and transmitted, preferably along a transmission path, such as a cross connect switch. As a result, it is ensured that exactly one cell is selected corresponding to a given routing code and fairness can be achieved through a pseudo-random assignment of unique routing codes.

The foregoing techniques enable a low power implementation for centralized arbitration which accommodates multiple decision factors. The techniques enable lower power and lower weight circuitry which results in higher capacity and/or lower cost. By using the preferred embodiment of the invention, the speed of arbitration is increased and the data throughput is maximized. The invention also enables serial transmission of decision information which minimizes input/output requirements and the requisite number of pin connectors, resulting in lower weight.

DETAILED DESCRIPTION OF THE INVENTION

Figure 1:
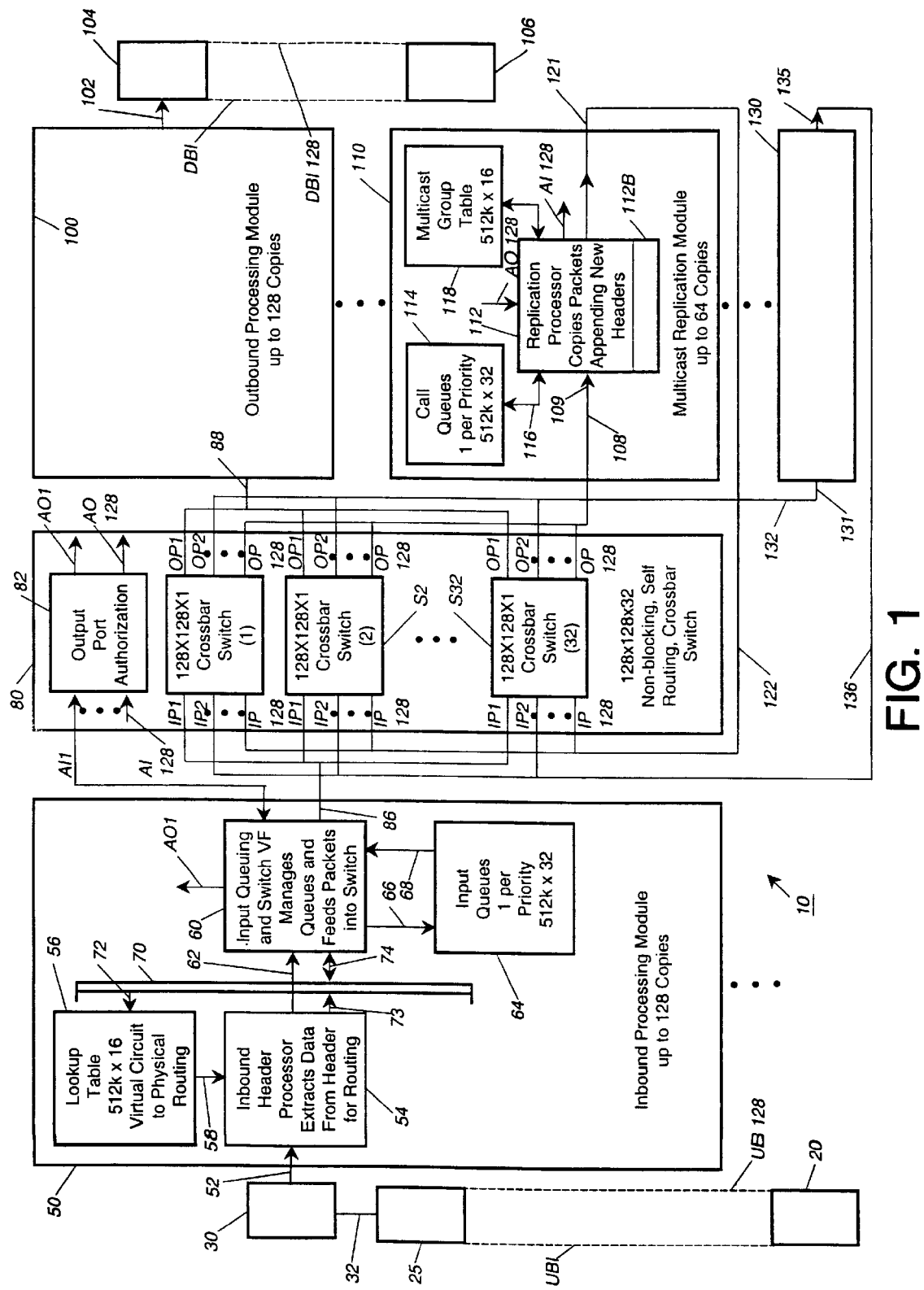
FIG. 1 is a schematic block diagram of a preferred form of the invention.

The components illustrated in FIG. 1 preferably are incorporated into an orbiting communication satellite 10. The preferred embodiment places on board satellite 10 a conventional uplink receiver 25, a conventional demodulator 30, multiple inbound processing modules, such as module 50, a switch module 80, multiple outbound processing modules, such as module 100, a downlink transmitter 104, and multiple multicast replication modules, such as modules 110 and 130.

Satellite 10 receives up to 128 uplink beams of radio frequency signals, such as beams UB1–UB128, from a group of ground-based communication stations collectively shown as 20. The uplink beams are received and processed by conventional uplink receiver 25 and are transmitted to conventional demodulator 30 over a lead 32.

As shown in FIG. 1, inbound processing modules, such as module 50, receive ATM data cells from demodulator 30 over an input bus 52. Module 50 includes a processor 54 which processes the header data from a conventional ATM cell comprising 53 octets of data. If an inbound ATM cell header includes a multicast routing code indicating that the cell requires multicast processing, the cell may be switched directly to an available multicast replication module 110 or 130 by switch module 80. The header of an ATM cell typically includes an identifier which can be assigned to indicate whether the cell requires ATM multicast processing. If the inbound ATM header does not indicate that multicast processing is required, the ATM cell may be switched directly to an outbound processing module, such as module 100, through switch module 80 using the routing code associated with the cell.

However, according to the preferred embodiment, processor 54 adds a routing code to the cells based on information in the ATM cell header and information located in a look up table memory 56 which communicates with processor 54 over a bus 58. The cells are tagged with a routing code from memory 56 corresponding to one of several multicast replication or outbound processing modules in the satellite, such as modules 100, 110 and 130. In other words, data is written into the ATM cell header which identifies a particular multicast replication module in which the ATM cell is to be replicated or outbound processing module corresponding to the appropriate downlink beam. Processor 54 preferably adds to the ATM cells 7 bits of information which include the routing code and an identification of priority of the cell. In addition, virtual path identifiers and channel path identifiers, as well as a downlink coding, also may be added to or replace a portion of the cells. As a result, the size of the ATM cells is expanded from the normal 53 octets to 56 octets.

Cells not requiring multicast processing do not need to have any information inserted into them if they include a routing code indicating to which of the output modules they need to be routed.

After processing the inbound ATM cells, processor 54 transmits the cells to a queue control logic unit 60 over a bus 62. Logic unit 60 transmits the ATM cells into queues of a memory 64 over a bus 66, and arranges the queues according to priority based on quality of service information in the ATM cell header.

Cells are stored in 32 bit words in queues of memory 64. As a result, it requires 14 transfers of data into memory 64 in order to transfer each 56 octet ATM cell.

At the appropriate time, the ATM cells stored in memory 64 are transmitted over a 32 bit input bus 86 to one of input ports IP1–IP128 of crossbar switches S1–S32 of switch module 80. Switches S1–S32 each include coupling circuitry for electrically coupling any input port to any output port. At any given time, an output port can be coupled to, at most, one input port. In the example shown in FIG. 1, bus 86 is connected to input port IPI of each of switches S1–S32. Bus 86 is coupled to processor 54 through control unit 60.

An output port arbitration and code reader 82 arbitrates between ATM cells stored in the queues and memories of the various input and multicast modules contending for the same output port. The code reader 82 uses the routing code and other criteria to select no more than one input port for each output port. Reader 82 signals control unit 60 over a serial conductor AO1 when the crossbar switches S1–S32 are available for the switching of data from module 50. Other input modules, as well as replication modules 110 and 130, are signaled over serial conductors A02–A0128.

During arbitration, code reader 82 reads the routing tag appended to the ATM cell which identifies the output port or node and module to which the cell is to be switched. Those cells which require no multicast processing are switched to one of output nodes or ports OP1–OP128 that are connected to an outbound processing module, such as module 100. In the example shown in FIG. 1, the input of outbound processing module 100 is connected to output node or port OP1 of each of crossbar switches S1–S32. In a well-known manner, the outbound processing module prepare the cells for transmission over one of transmitting beams DB1–DB128. After processing by module 100, the ATM cells are transmitted through an output 102 to a modulator of the downlink transmitter circuitry 104 of satellite 10.

According to the preferred embodiment, there are as many inbound processing modules as uplink beams processed by the uplink receiver. As a result, there are up to 128 inbound processing modules like module 50 shown in FIG. 1, one for each of 128 uplink beams, such as beams UB1–UB128.

Satellite 20 includes a downlink transmitter capable of simultaneously broadcasting up to 128 beams of data, DB1–DB 128, to a group of ground-based communications stations collectively shown as 106. According to the preferred embodiment, there are as many outbound processing modules as downlink transmitting beams. As a result, there are up to 128 outbound processing modules like module 100 shown in FIG. 1, one for each of the downlink beams, such as beams DB1–DB128.

ATM cells which are tagged by routing codes to indicate the need of multicast processing are read by circuit 82 and are switched to output ports of switch module 80 that are connected to a multicast replication module, such as module 110. In the example shown in FIG. 1, a 32 bit output bus 108 connects each of output nodes or ports OP128 of crossbar switches S1–S32 to an input 109 of a replication processor or logic unit 112 of multicast replication module 110. Replication unit 112 generates copies of the cell acording to a multicast group table in a memory 118. The routing code and portions of the header of each copy is modified accordingly with values in the multicast group table. Processor 112 replicates or copies the data cell the required number of times and inserts in each replicated cell the foregoing data from memory 118 When port arbitration and reader circuit 82 indicates that switch module 80 is available over a serial conductor AO 128, the replicated ATM cells are transmitted from an output 121 of module 110 over a 32 bit bus 122 to input ports of switch module 80. In the example shown in FIG. 1, output 121 is connected to input ports IP 128 of each of crossbar switches S1–S32. Circuit 82 reads the routing code in the replicated ATM cells (which replaces the multicast routing code) and switches the cells to one of the outbound processing modules, such as outbound processing module 100, over bus 88. In a well-known manner, the outbound processing module prepares the cells for transmission over one of transmitting beams DB1–DB128. After processing by module 100, the ATM cells are transmitted through an output 102 to a modulator of the downlink transmitter circuitry 104 of satellite 10.

According to the preferred embodiment, additional multicast replication modules may be added to satellite 10 as required by a customer's need for multicast replication processing. For example, an additional multicast replication module 130 identical to module 110 may be added as shown in order to enable simultaneous multicast processing by modules 110 and 130. Module 130 includes an input 131 connected to a 32 bit bus 132 which is connected to output nodes or ports OP2 of each of crossbar switches S1–S32. Replication module 130 also includes an output 135 which is connected to input ports IP2 of each of crossbar switches S1–S32 over a 32 bit bus 136.

Figure 2:
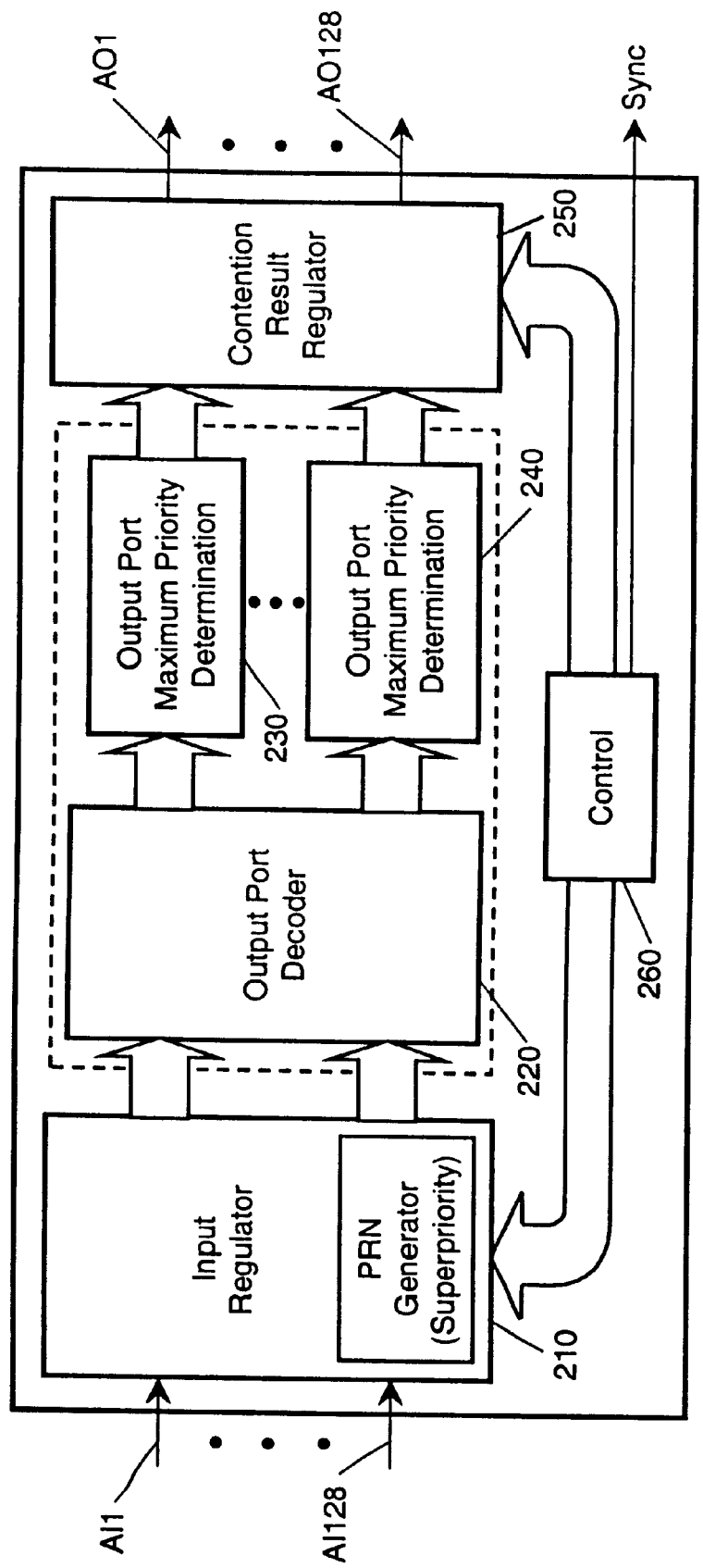
FIG. 2 is a schematic block diagram of the output port arbitration module shown in FIG. 1.

Arbitration module 82 is shown in more detail in FIG. 2. The module forms a logic unit for conducting arbitration. Input register 210 receives serial routing and decision factor codes (including priority codes) from the various input modules, such as module 50, over serial input conductors AI1–AI128. An output port decoder 200 orders the decision factor codes according to the routing codes. This operation groups decision factor codes contending for the same output port or node of switch 80. Output port maximum priority determinators 230 and 240 determine the highest decision factor contending for the same output port. The number of the determinators may vary depending on the speed of operation required. A contention result register 250 latches a bit indicating whether an input port of switch 80 is available to receive an ATM cell. The bits are transmitted over serial output conducts A01–A0128 to the queue manager circuits in the various input modules or to the processors in the replication modules, such as 110 and 130. If a bit has a "1" value, the corresponding input port is granted permission to transfer an ATM cell to switch module 80. A controller 260 controls the operation of circuits 210, 220, 230, 240 and 250.

Module 82 may be implemented as a variety of logic units, such as a microprocessor, microsequencer, microcontroller, digital signal processor or the hard-wired circuits shown in FIG. 2

In operation module 82 performs arbitration between multiple inputs by appending a pseudo random sequence number to the priority and other arbitration decision factors to select a single source when all decision factors are equal. The arbitration function receives inputs from multiple sources (i.e., input modules and replication modules), each of which is attempting to transfer a cell to one of multiple destinations (i.e. nodes or output ports of switch 80). The mapping of sources to destinations during any given opportunity is essentially random and, since only one source may transmit data to a given output during one transfer opportunity, it is necessary to arbitrate between sources contending for the same destination. To support ATM qualities of service, it is necessary to take factors such as priority, queue occupancy and cell age into account. For the purposes of this specification, these will be grouped together and called decision factors. When multiple sources are contending for the same destination and all decision factors are equal, it is necessary to select between sources fairly such that no one source is favored over any other.

The selection can be made by performing a serial comparison for each destination between all sources contending for that destination. A serial comparison between all sources performed in parallel based on the decision factors can quickly find the sources with the highest decision factor. However, this comparison by itself does not guarantee a single source for the destination, since there could be ties in the decision factors.

The problem is solved by appending a pseudo random sequence of bits to the decision factors such that each source is assigned a unique sequence:

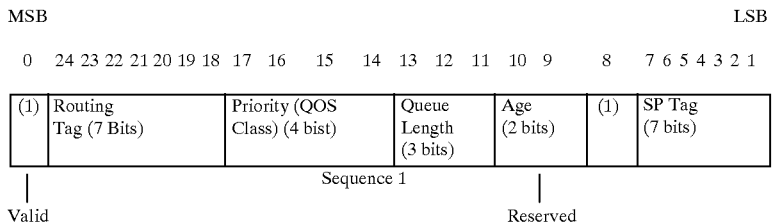

The pseudo random sequence of Sequence 1 (bits 1–7) will be referred to as a superpriority (SP) which is used to select between ports when all other decision factors are equal. The number of bits required for SP(n) is such that $2^n \geq$ to the number of sources so that each source can be assigned a unique SP. This ensures that for each arbitration, at most there is a single source selected for each destination.

Since the arbitration can be performed serially, the amount of I/O required from each source is only a single input line to serially transmit the routing code and decision factors and a single output line to serially transmit a bit indicating an award of arbitration (e.g. lines AI1 and AO1). Lines AI1 and AO1 could be combined into a single line. The arbitration algorithm also works with more than a 1 bit serial interface and trades speed for I/O.

By using a pseudo random sequence which changes on each arbitration, it can be guaranteed that the arbitration does not consistently favor one physical port over another which would result in unfair and inefficient switch performance. The serial comparators (e.g. determinator 230 and 240) have extremely low power, low I/O count and fast decision making.

As an example, consider the case where there are 128 sources and 128 destinations and a single serial input line per source is used. Seven destination bits are required to specify a destination, node or port. Seven superpriority (SP) bits are required to supply a unique and different sequence and number to each of the 128 sources. Possible decision factors could be priority, age and queue occupancy or length. For 16 priorities there would be 4 bits in the sequence. Assume the age and queue occupancy are identified by 2 bits and 3 bits, respectively.

The data in memory 64 (FIG. 1) is ordered according to quality of service priority bits. The first ATM cell in memory 64 is addressed, and the decision factor bits in Sequence 1 minus the SP tag are read from the addressed cell, converted to serial form and transmitted to one of input registers 210 (FIG. 2). Controller 260 appends the SP tag as shown in Sequence 1. The other input modules transfer data to other registers in register 210 in the same manner described for module 50. The bit sequences in registers 210 are transferred to decoder 220 where the sequences are sorted according to routing code. Alternatively, a table of address pointers ordered according to routing code can be used. Other methods of grouping sequences destined for the same output port or node also can be used.

Sequences with like routing codes or destined for the same output port or node then are compared serially in determinators 230 and 240. The various priority factors are weighted according to their position in the sequence bit stream. The superpriority bits are appended to the bit positions shown in sequence 1. If the decision factors are equal, the compared sequences are selected according to the SP bits (bits 1–7).

After a sequence is selected, a corresponding bit in register 250 is set to a "1" value, and the value then is transmitted to the circuit from which the decision factors of the selected sequence were read, i.e., to a queue manager (such as 60) for one of the input modules or to a replication logic unit (such as 112) for one of the replication modules. The module receiving the "1" value then transmits the corresponding ATM cell from its memory to one of input ports or nodes IP1–IP 128.

The routing code of the selected ATM cell is transmitted to switches S1–S32 so that the selected cell is switched to the proper output port.

Those skilled in the art will recognize that the preferred form of the invention may be altered or modified without departing from the true spirit and scope of the invention as defined in the accompanying claims. For example, the system can operate not only on ATM cells, but other forms of packet switching cells. The reader of the ATM cell header need not be in switch module 80, but also can be located in other modules. The nodes described in connection with switch module 80 can be moved to other locations. Switch module 80 may comprise a bus structure in which modules 100, 110 and 130 take the form of peripheral devices addressed by the bus. The logic unit controlling the arbitration can be distributed among modules 50, 80 and 100.

What is claimed is:

1. In a satellite communication system, improved arbitration apparatus comprising in combination:
   a data path having one or more input nodes and one or more output nodes;
   one or more addressable memories storing data cells with corresponding routing codes indicating output nodes and corresponding decision factor codes indicating priority of transmission over the data path;

a logic unit connected to read at least some of the decision factor codes and corresponding routing codes from the memory, to associate with the read decision factor codes a unique arbitration code, to compare the read decision factor codes corresponding to one node of the one or more output nodes, and, in the event the compared decision factor codes are identical, to compare the unique arbitration codes associated with the compared decision factor codes, to select one of the unique arbitration codes and to read from the memory to the one or more input nodes the data cell corresponding to the selected unique arbitration code, whereby the order in which the data cells corresponding to the compared decision factor codes are given access to the data path may be determined.

2. Apparatus, as claimed in claim 1, wherein the logic unit is connected to group the decision factor codes according to corresponding routing codes.

3. Apparatus, as claimed in claim 2, wherein said unique arbitration code comprises a different number assigned for each of the grouped decision factor codes.

4. Apparatus, as claimed in claim 1, wherein said unique arbitration code comprises a pseudo random sequence number.

5. Apparatus, as claimed in claim 1, wherein the logic unit is connected to read the decision factor codes from the memory serially and to compare the decision factor codes serially.

6. Apparatus, as claimed in claim 1, wherein the logic unit is connected to order at least some of the decision factor codes in the memory.

7. Apparatus, as claimed in claim 6, wherein the decision factor codes comprise quality of service codes and wherein at least the decision factor codes in the memory are ordered according to the quality of service codes.

8. Apparatus, as claimed in claim 1, wherein the data path comprises a switch comprising a predetermined number of input ports and a predetermined number of output ports, wherein the memory comprises a plurality of memories, each memory corresponding to a different one of the input ports and further comprising a plurality of busses, each bus coupling one of the plurality of memories to a different one of the input ports.

9. Apparatus, as claimed in claim 7, wherein the switch routes the data cell to the output port corresponding to the routing code.

10. Apparatus, as claimed in claim 1, and further comprising a serial conductor coupling the memory to the logic unit, the serial conductor carrying the decision factor codes and the routing codes.

11. In a satellite communication system, an improved arbitration method comprising the steps of:

storing data cells with corresponding routing codes and corresponding decision factor codes;

associating at least some of the decision factor codes with unique arbitration codes;

comparing decision factor codes corresponding to like routing codes, and, in the event the compared decision factor codes are identical, comparing the unique arbitration codes associated with the compared decision factor codes; and transmitting the data cell corresponding to one of the compared unique arbitration codes, whereby the order in which the data cells corresponding to the compared decision factor codes are transmitted may be determined.

12. A method, as claimed in claim 11, and further comprising the step of grouping the decision factor codes according to the corresponding routing codes.

13. A method, as claimed in claim 12, including assigning a different number for each of the grouped decision factor codes within said unique arbitration code.

14. A method, as claimed in claim 11, comprising assigning a pseudo random sequence number in said unique arbitration code.

15. A method, as claimed in claim 11, comprising performing the step of comparing serially.

16. A method, as claimed in claim 11, including utilizing quality of service codes as the decision factor codes and wherein the step of storing comprises the step of ordering at least the priority codes according to the quality of service codes.

17. A method, as claimed in claim 11, wherein the step of transmitting comprises the step of routing the data cell according to the corresponding routing code.

* * * * *